US011194856B2

(12) United States Patent
Mahadevan et al.

(10) Patent No.: US 11,194,856 B2
(45) Date of Patent: Dec. 7, 2021

(54) COMPUTERIZED SYSTEM AND METHOD FOR AUTOMATICALLY IDENTIFYING AND PROVIDING DIGITAL CONTENT BASED ON PHYSICAL GEOGRAPHIC LOCATION DATA

(71) Applicant: VERIZON MEDIA INC., New York, NY (US)

(72) Inventors: Vijay Mahadevan, San Francisco, CA (US); Sachin Sudhakar Farfade, Santa Clara, CA (US); Jay Kiran Mahadeokar, Santa Clara, CA (US); Ayyappan Arasu, Cupertino, CA (US); Venkat Kumar Reddy Barakam, Sunnyvale, CA (US); Ayman Kaheel, Sunnyvale, CA (US)

(73) Assignee: VERIZON MEDIA INC., New York, NY (US)

( * ) Notice: Subject to any disclaimer, the term of this patent is extended or adjusted under 35 U.S.C. 154(b) by 543 days.

(21) Appl. No.: 15/451,819

(22) Filed: Mar. 7, 2017

(65) Prior Publication Data
US 2018/0260417 A1 Sep. 13, 2018

(51) Int. Cl.
  *G06F 16/58* (2019.01)
  *G06F 16/587* (2019.01)
  (Continued)

(52) U.S. Cl.
  CPC ........ *G06F 16/5866* (2019.01); *G06F 16/535* (2019.01); *G06F 16/583* (2019.01);
  (Continued)

(58) Field of Classification Search
  CPC .... G06F 16/58; G06F 16/5866; G06F 16/583; G06F 16/535
  See application file for complete search history.

(56) References Cited

U.S. PATENT DOCUMENTS

| | | | |
|---|---|---|---|
| 8,370,282 B1 * | 2/2013 | Leung | G06K 9/6263 706/20 |
| 8,751,530 B1 * | 6/2014 | Ioffe | G06F 16/583 707/772 |

(Continued)

OTHER PUBLICATIONS

Wikipedia, Deep learning, https://web.archive.org/web/20141216232506/http://en.wikipedia.org/wiki/Deep_learning, Dec. 16, 2014, 15 pp. (Year: 2014).*

*Primary Examiner* — Marc S Somers
(74) *Attorney, Agent, or Firm* — James J. DeCarlo; Greenberg Traurig, LLP

(57) ABSTRACT

Disclosed are systems and methods for improving interactions with and between computers in content searching, generating, hosting and/or providing systems supported by or configured with personal computing devices, servers and/or platforms. The systems interact to identify and retrieve data within or across platforms, which can be used to improve the quality of data used in processing interactions between or among processors in such systems. The disclosure provides a novel, computerized framework for automatically selecting the most definitive, precise and high-quality content files corresponding to POIs. The disclosed systems and methods utilize the performance of visual comparisons with a set of definitive content files of a given POI, and by incorporating visual aesthetic features as a factor of such comparisons, a search result is identified that down-weights imprecise and poor quality content files of a given POI, and ensures that only high quality, accurate content files are selected or identified.

20 Claims, 9 Drawing Sheets

(51) Int. Cl.
  *G06F 16/535* (2019.01)
  *G06F 16/583* (2019.01)
  *G06F 16/9537* (2019.01)

(52) U.S. Cl.
  CPC ........ *G06F 16/587* (2019.01); *G06F 16/5838* (2019.01); *G06F 16/9537* (2019.01)

(56) References Cited

U.S. PATENT DOCUMENTS

| | | | | |
|---|---|---|---|---|
| 9,025,811 | B1* | 5/2015 | Ioffe | G06K 9/62 382/100 |
| 10,126,141 | B2* | 11/2018 | Golding | G01C 21/3644 |
| 2007/0174865 | A1* | 7/2007 | Jing | G06Q 30/06 725/28 |
| 2009/0290812 | A1* | 11/2009 | Naaman | G06K 9/4671 382/305 |
| 2011/0258049 | A1* | 10/2011 | Ramer | G06Q 30/02 705/14.66 |
| 2012/0226687 | A1* | 9/2012 | Xu | G06F 16/3338 707/728 |
| 2013/0089243 | A1* | 4/2013 | Sauve | G06K 9/68 382/118 |
| 2013/0204866 | A1* | 8/2013 | Fork | G06F 16/5866 707/723 |
| 2014/0177966 | A1* | 6/2014 | Kaheel | G06K 9/00677 382/195 |
| 2014/0181089 | A1* | 6/2014 | Desmond | G06F 16/5866 707/722 |
| 2014/0280234 | A1* | 9/2014 | Chang | G06F 16/9535 707/749 |
| 2015/0186366 | A1* | 7/2015 | Yan | G06F 16/248 707/741 |

\* cited by examiner

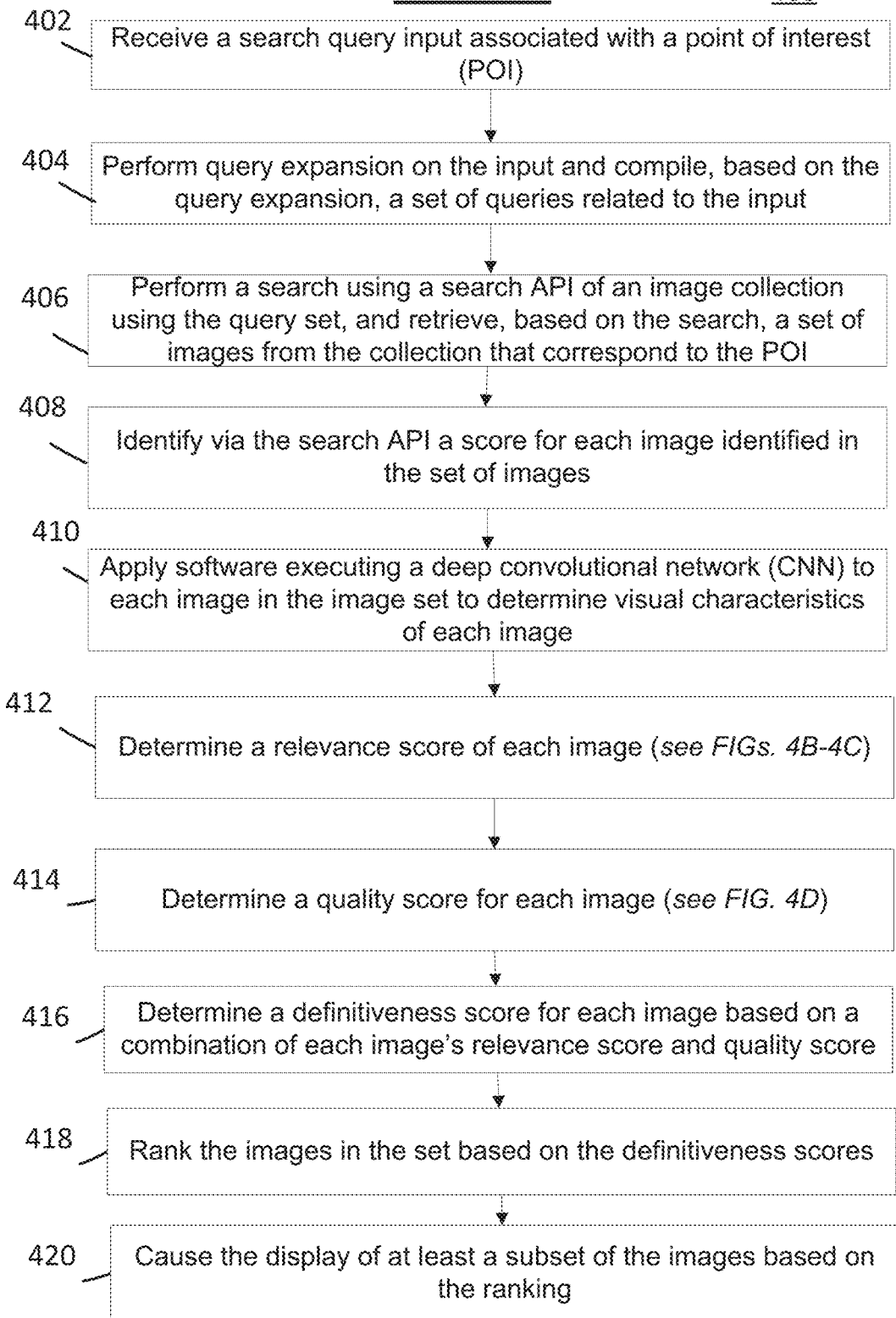

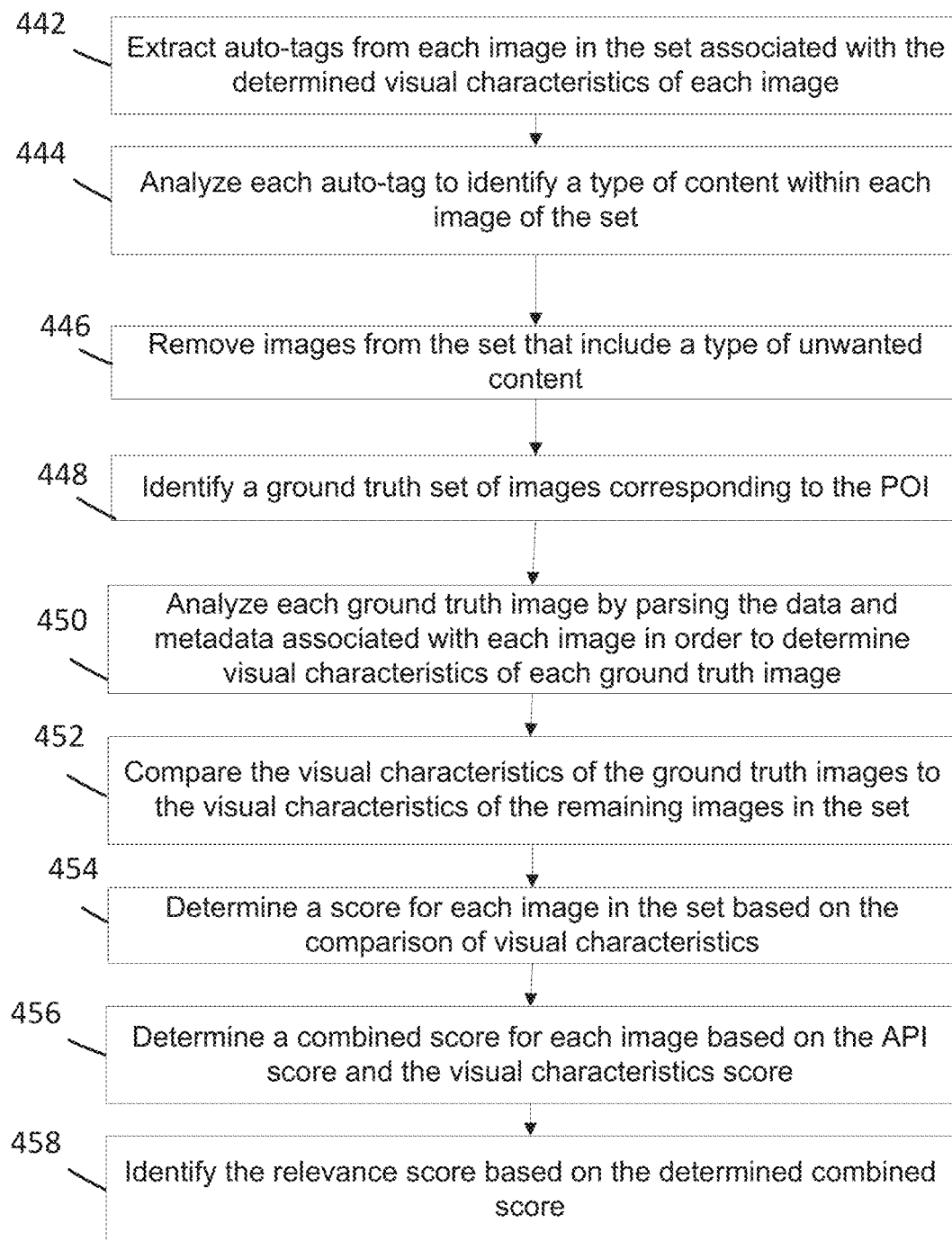

FIG. 4C      412
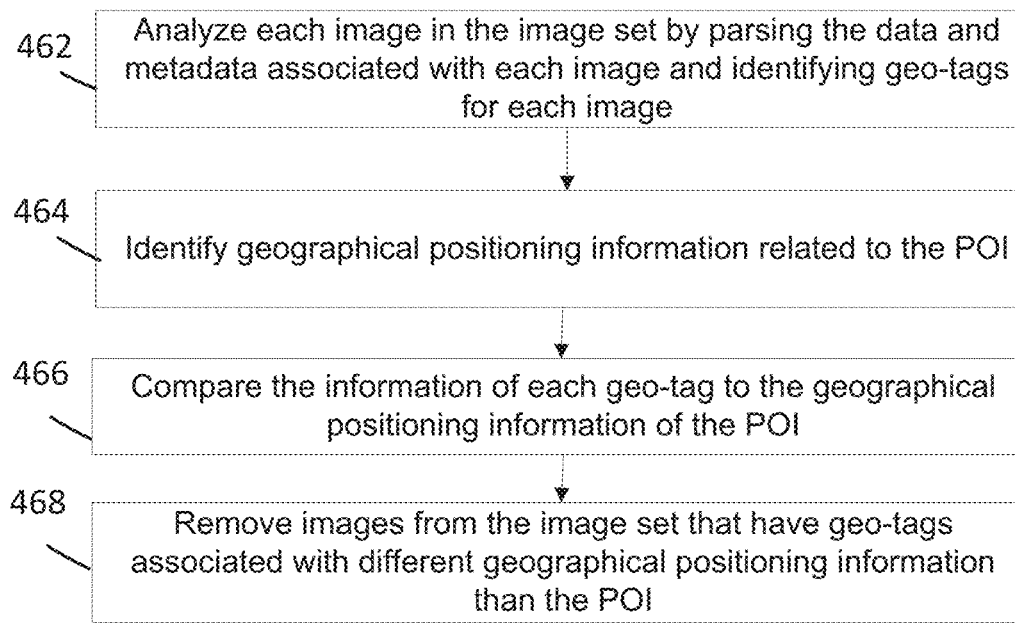

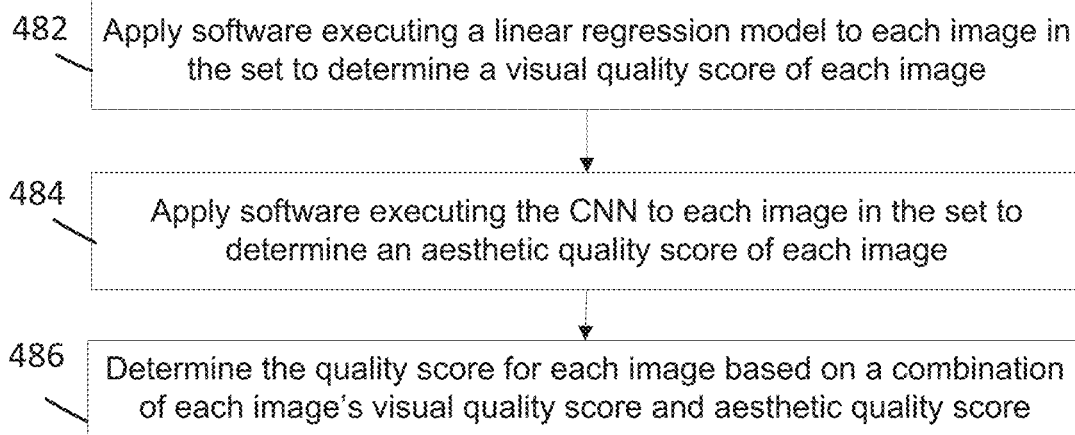
FIG. 4D     414

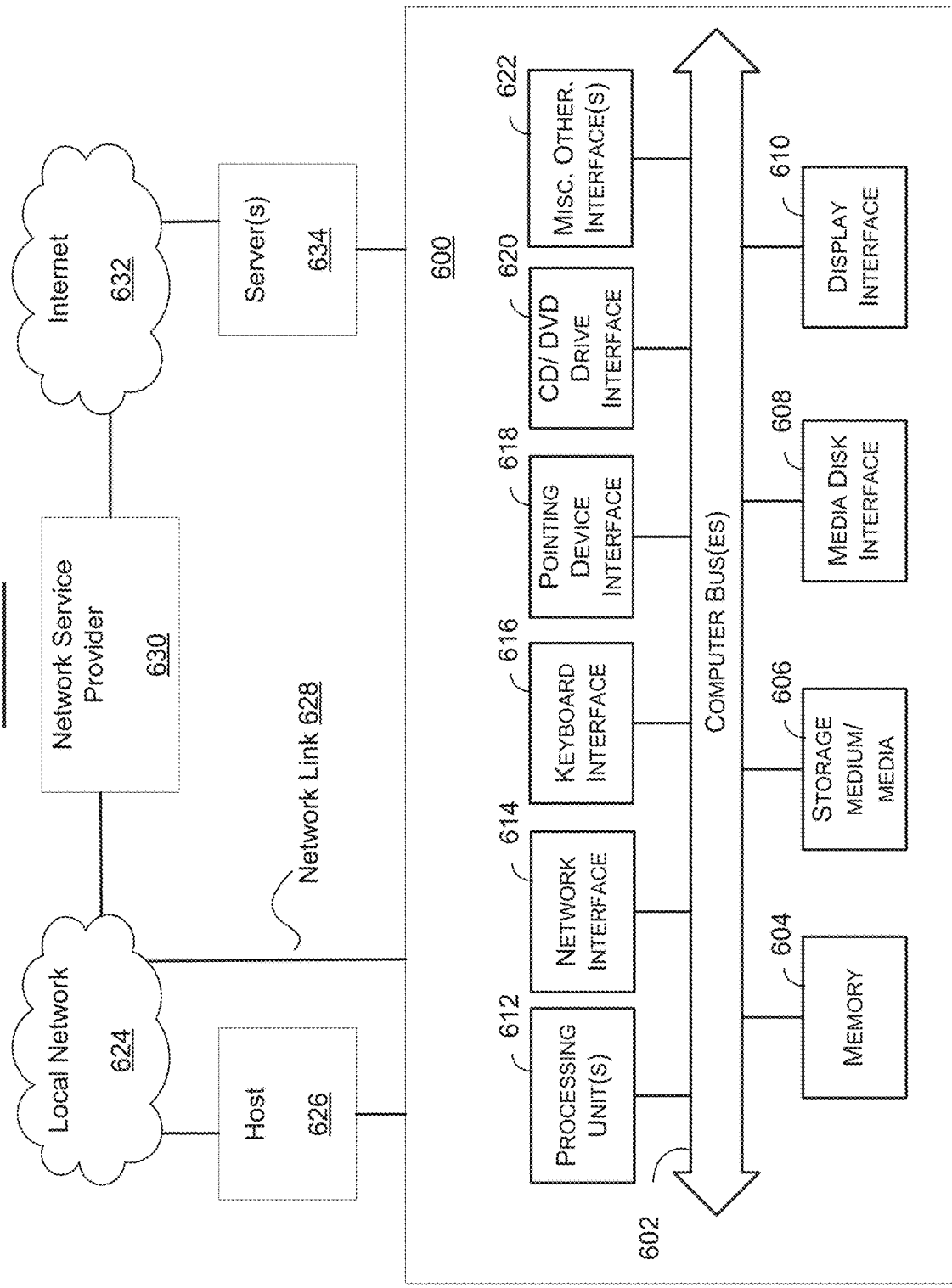

COMPUTERIZED SYSTEM AND METHOD FOR AUTOMATICALLY IDENTIFYING AND PROVIDING DIGITAL CONTENT BASED ON PHYSICAL GEOGRAPHIC LOCATION DATA

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content searching, generating, providing and/or hosting computer devices, systems and/or platforms by modifying the capabilities and providing non-native functionality to such devices, systems and/or platforms for a novel and improved framework for automatically analyzing digital content files based on electronic data associated with a physical geographic location, and communicating those determined files for display to a user.

SUMMARY

There currently exists a number of conventional search systems that perform searches for digital content (also referred to as media, interchangeably) based on specific locations—geographic identifiers referred to as points of interest (POI). However, almost all of such systems utilized only metadata features to retrieve relevant content. For example, a search for images based on a query requesting content depicting "Lake Tahoe" would focus only on analyzing the metadata of images in a collection of images (e.g., a database of images), and identifying those images that have metadata matching the query (e.g., metadata indicating that the image(s) identified in the search were taken at Lake Tahoe). This often leads to imprecise results that impact a user's experience with, for example, the search landing page, over saturation of a "hero" image being shown (e.g., the same image being provided in or as the result despite varying queries related to the same subject/context), and "high-quality" images being lost in the shuffle because they are indecipherable from other "low-quality" images. Some conventional systems have attempted to remedy these shortcomings by enabling a human editor to manually annotate images in a collection with POI information (e.g., tags or other forms of annotatable data to a digital file); however, this is limited to not only a human's understanding of digital information comprised within and/or surrounding a file, but also the speed and capacity of the human.

As such, the disclosed systems and methods provide an improved computerized framework that enables an algorithmic approach to performing a POI content search. The present disclosure provides integrated systems and methods that combine analyzed and determined metadata and visual features of digital content files in order to automatically select the most definitive, precise and high-quality content files corresponding to POIs. According to embodiments of the present disclosure, the disclosed systems and methods utilize the performance of visual comparisons within a set of definitive content files of a given POI, and by incorporating visual aesthetic features as a factor of such comparisons, the disclosed systems and methods produce a search result that down-weights imprecise and poor quality content files of a given POI, and ensures that only high quality, accurate content files are selected or identified.

Reference herein will be directed to analyzing and identifying images or photos (used interchangeably) in reference to digital content/media files; however, it should not be construed as limiting, as any type of digital media/content can be searched according to the disclosed systems and methods. For example, the disclosed system sand methods can perform the disclosed searching (e.g., analysis, identification, ranking, scoring, and the like, as discussed below in more detail) respective to any type of known or to be known digital content (i.e., data and/or metadata) and/or digital content file, which can include, but is not limited to, video, text, audio, short form videos (e.g., graphics interchange files (GIFs)) and/or any other type of known or to be known multi-media item or object.

It will be recognized from the disclosure herein that the disclosed systems and methods embodiments provide improvements to a number of technology areas, for example those related to systems and processes that handle or process images (i.e., digital content) for users or business entities, and provide for improved user loyalty, improved image publishing, improved advertising opportunities, improved image search results, and the like. By utilizing the disclosed systems and methods, users and/or business entities are afforded a more accurate, high-quality set of search results, which each can leverage in order to increase user engagement, followers, exposure on the internet and real-world, and business opportunities where identified content can be leveraged when providing other users content identified from a search.

Accordingly, in one or more embodiments, a method is disclosed for a novel, computerized framework for automatically analyzing digital content files based on electronic data associated with a physical geographic location, and, as a result of such analysis, communicate those determined files for display to a user. According to some embodiments, the disclosed systems and methods can involve determining visual aesthetic features of content files, compare these features to other files' features, and then compile and provide a search result for POI content that down-weights imprecise and poor quality content files while elevating only high quality, accurate content files within the result.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for a novel and improved framework for automatically analyzing digital content files based on electronic data associated with a physical geographic location, and communicating those determined files for display to a user.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 4A-4D are flowcharts illustrating steps performed in accordance with some embodiments of the present disclosure;

FIG. 6 is a block diagram illustrating the architecture of an exemplary hardware device in accordance with one or more embodiments of the present disclosure.

DESCRIPTION OF EMBODIMENTS

Figure 1:
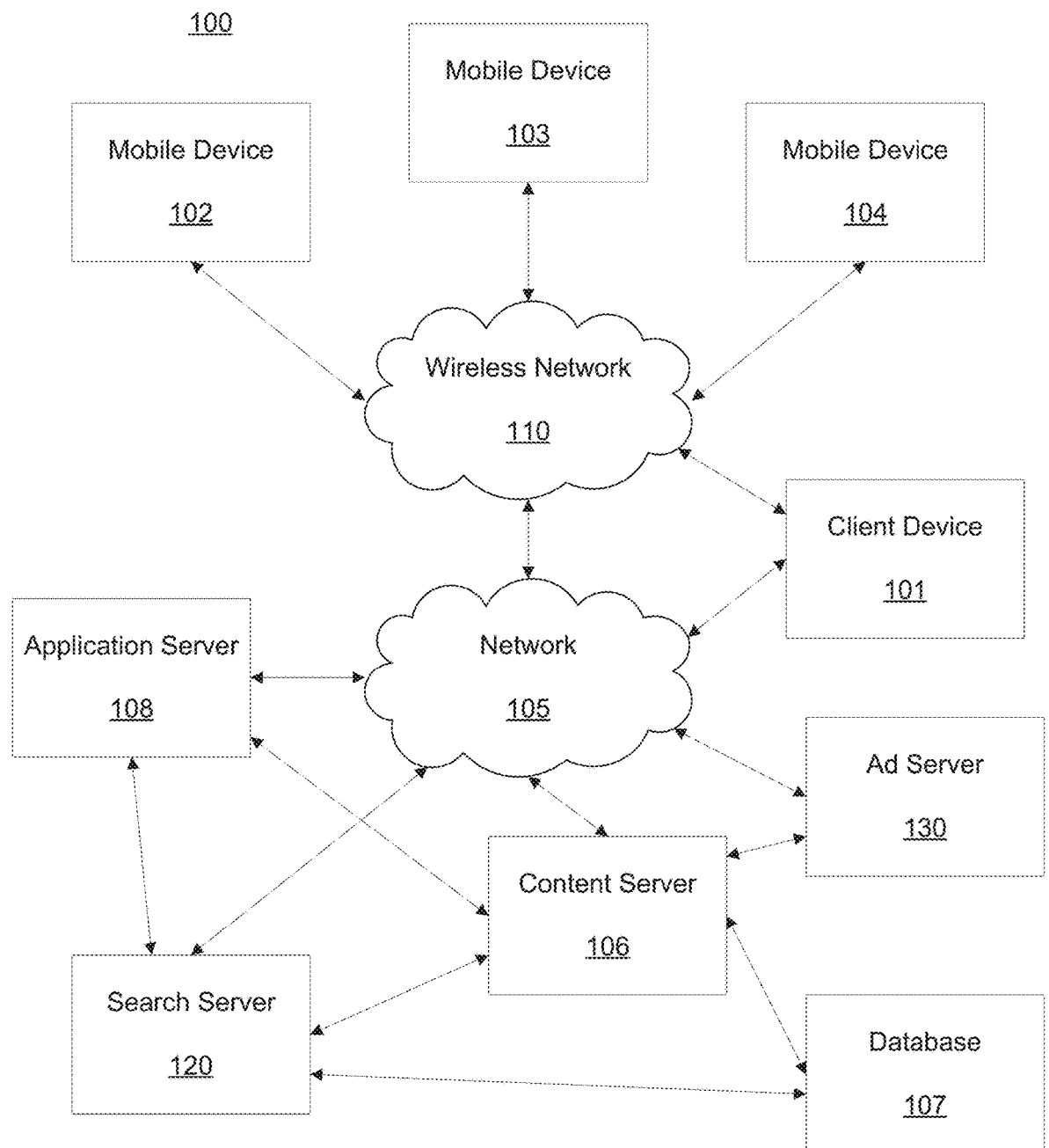
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, 4G or 5G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram®, to provide only a few possible examples. A client device may also include or execute an application to communicate content, such as, for example, textual content, multimedia content, or the like. A client device may also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The present disclosure provides a novel, computerized framework that performs content discovery on a network by integrating factors related to metadata and visual feature analysis of digital content files, thereby automatically identifying and selecting the most definitive, precise and high-quality content files corresponding to POIs.

According to some embodiments of the instant disclosure, the disclosed systems and methods perform a search for digital content associated with a POI based on, at least in part, visual comparisons of a set of content files. Such search, in embodiments of the instant disclosure, involves the incorporation of visual aesthetic features as a factor for identifying the most definitive, precise and high-quality content files corresponding to the POI. Therefore, as discussed in more detail below, the disclosed systems and methods produce a search result that down-weights imprecise and poor quality content files of a given POI, and ensures that only high quality, accurate content files are selected or identified for the search result.

As evidenced from the disclosure herein, the disclosed systems and methods resultant automatic determination, generation, selection or otherwise identification of a definitive set of content files for a POI solves two major problems associated with conventional processes of manually annotating content files as being definitive. First, the automatic determination of definitive content files for a POI eliminates the need for manual effort to tag content files for each entity (e.g., POI). Secondly, the disclosed systems and methods scale the generation of definitive content files and "hero" content file cards (e.g., electronic content cards providing display and/or access to digital content resources on a network) to all POI entities in a corpus of content files, thereby enabling the device(s) performing the disclosed systems and methods to provide rich, engaging content for all types and forms of POI queries.

In some embodiments, the disclosed systems and methods can be utilized to identify content files that are not only "high-quality," but also those that are relevant to a particular POI (or other form of context). For example, Flickr® has functionality for providing a stream of images related to a topic—e.g., San Francisco, Calif. ("SF"). In some instances, images may be tagged as associated with SF, however, such images are not depictions of the city, or are not related to nor display content specific to SF (e.g., depicts a picture of a person's apartment that may be in SF, but this is of no interest to a user viewing a stream of SF pictures). By implementing the disclosed systems and methods, these imprecise images within the stream can be eliminated, and only those images that are related to the POI (i.e., SF), and are of "high-quality" will be included in the stream.

Thus, as discussed herein, the disclosed systems and methods can be implemented (or deployed by third parties) to not only search for and identify "high-quality," relevant content files related to a POI, but they can also i) be utilized to surface the best content items in a collection, ii) be leveraged for providing third party content (e.g., ad content, as discussed in relation to FIG. 5 below), and/or iii) for arranging files in an album or group according to their determined quality values, such that the display within the album/group (or display as content within a thumbnail cover image for the album/group) depicts the best (e.g., highest quality) content file in the album/group.

As understood by those of skill in the art, the term "high-quality" refers to an item of digital content satisfying a quality threshold, which can be set by a user, site administrator, artist creating/capturing the content, the system, service or platform hosting the content, the search engine 300 or device hosting the engine 300 (as discussed below), or some combination thereof. In a non-limiting example, "high-quality" can refer to the digital content being of interest to a user(s), where interest (or user engagement) can be based on the number of times a user has interacted with the content (e.g., viewed, shared, commented, downloaded, re-blogged, re-posted, favorited, liked, and the like) at or above the quality threshold. In another non-limiting example, "high-quality" content can relay that the content is aesthetically pleasing or technically sound, in that the data associated with the content produces a resolution, focus, pixel quality, size, dimension, color scheme, exposure, white balance and the like, or some combination thereof that satisfies the quality threshold. For example, a content item's quality can be determined via implementation of a pair-wise loss function which scores the content item's quality based on the content item's attributes, parameters or features.

In another non-limiting example, "high-quality" or "highest quality" (used interchangeably) can refer to the digital file (e.g., an image file) being of interest to a user(s), where interest (or user engagement) can be based on: latent values of the content item (e.g., semantic tags of the content item), positional information of the content item (e.g., the location within the group—is it the first item in the group?; is it the last?; its ordinal position from the group's start; and its position from the end), time delta features of the content item (e.g., the delta from: the previous item in the group, the next item in the group, the first item in the group, and the last item in the group), inappropriateness (e.g., mature content), and the like.

In some embodiments, as understood by those of skill in the art, "high quality" can also impart a value indicating a content item's relevance, which refers to a content item satisfying a relevance threshold to a given context (e.g., a POI, as discussed herein), which can be set by a user, site administrator, artist creating/capturing the content, the system, service or platform hosting the content, or some combination thereof. In some embodiments, relevancy can be quantified (or scored). For example, a content item's relevancy can be determined via implementation of a logistic loss function which quantifies a content item's parameters or features and ranks them according to such scoring. Discussion of how to quantify a content item's relevance is discussed in more detail below.

As discussed in more detail below at least in relation to FIG. 5, according to some embodiments, information associated with, derived from, or otherwise identified from, during or as a result of a search, identification and/or communication of a digital content item, as discussed herein, can be used for monetization purposes and targeted advertising when providing, delivering or enabling devices access to such digital content.

For example, a "definitiveness" score (which imparts a value indicating a content item's quality, relevance and accuracy, as discussed below), as discussed herein, can be used to monetize a content provider's collection of images, in that premium rates for advertising next to the most definitive images of select places of interest can be set. For example, the disclosed systems and method provide the functionality for a content provider selling advertising space on a UI portion of the provider's web-space at a rate proportional to how beautiful (e.g., "high quality") and/or canonical an image is that is displayed on the same UI. For example, images of "Ghirardelli Square," can be leveraged to increase the rate of costs for the company "Ghirardelli®" to purchase ad space on the webpage displaying the images.

Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), Dynamic HyperText Markup Language (DHTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, service or an associated application, such as, an email or messaging platform (e.g., Yahoo!® Mail), a social networking site, a photo sharing site/service (e.g., Tumblr®), a search platform or site, or a personal user site (such as a blog, vlog, online dating site, and the like) and the like. A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like. Likewise, the search server 120 may include a device that includes a configuration to provide content via a network to another device.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content may include videos, text, audio, images, or the like, which may be processed in the form of physical signals, such as electrical signals, for example, or may be stored in memory, as physical states, for example.

In a similar manner as the content server 106, the search server 120 may include a device that includes a configuration to provide content via a network to another device. The search server 120 can, for example, host a site, service or an associated application, such as, an search engine (e.g., Yahoo! ® Search, Bing®, Google Search®, and the like), a social networking site, a photo sharing site/service (e.g., Tumblr®), and the like. Additionally, the search server 120 can further provide a variety of services similar to those outlined above for the content server 106.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a search application (e.g., Yahoo! ® Search), mail or messaging application (e.g., Yahoo! ® Mail, Yahoo! ® Messenger), a photo sharing/user-generated content (UGC) application (e.g., Flickr®, Tumblr®, Instagram® and the like), a streaming video application (e.g., Netflix®, Hulu®, iTunes®, Amazon Prime®, HBO Go®, and the like), blog, photo or social networking application (e.g., Facebook®, Twitter® and the like), and the like, can be hosted by the application server 108 (or content server 106, search server 120 and the like).

Thus, the application server 108 can store various types of applications and application related information including application data and user profile information (e.g., identifying and behavioral information associated with a user). It should also be understood that content server 106 can also store various types of data related to the content and services provided by content server 106 in an associated database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
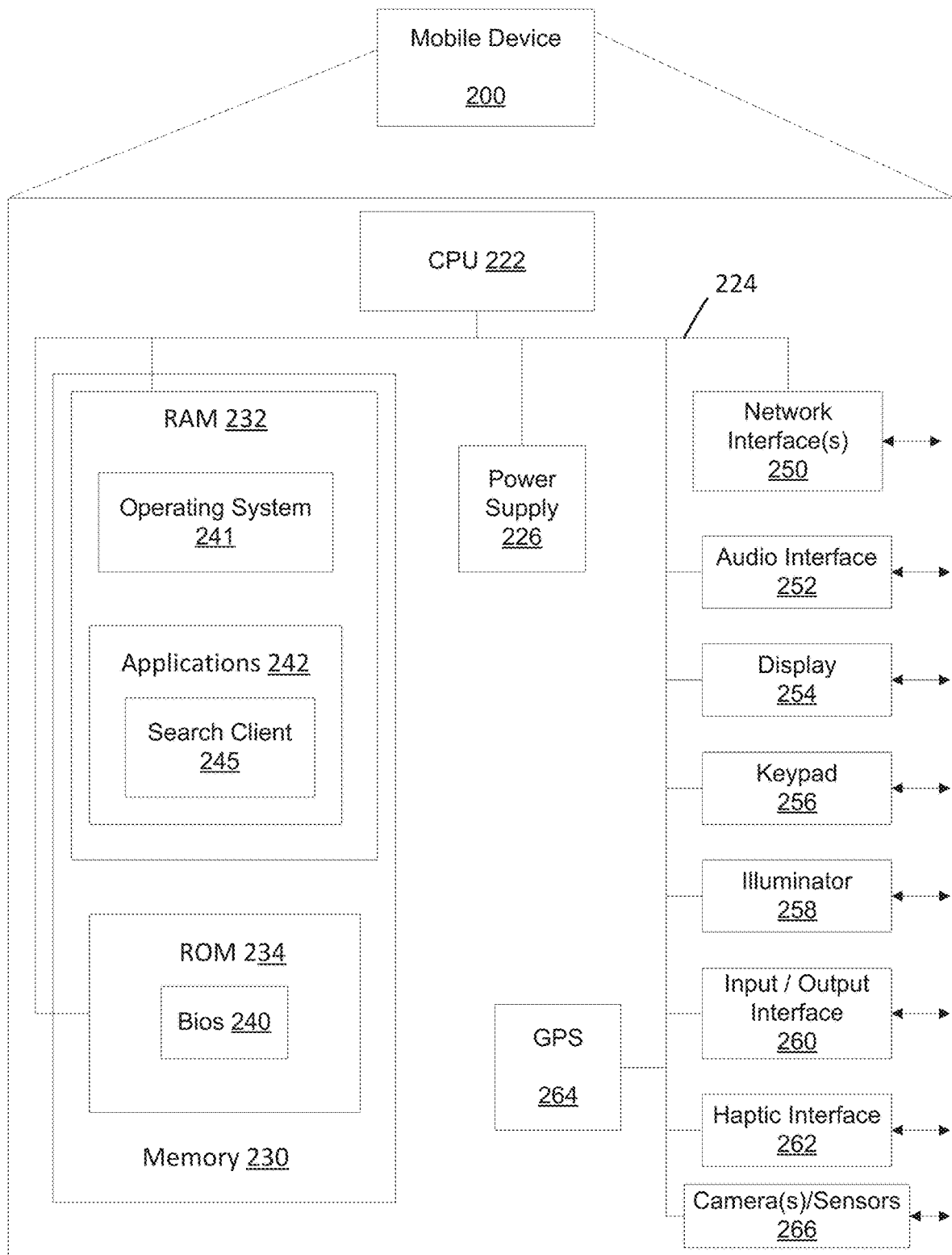
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving digital content (e.g., advertisements) or other forms of digital data associated with, but not limited to, IMs, emails, and other types of known messages, or the like.

Having described the components of the general architecture employed within the disclosed systems and methods, the components' general operation with respect to the disclosed systems and methods will now be described below with reference to FIGS. 3-4D.

Figure 3:
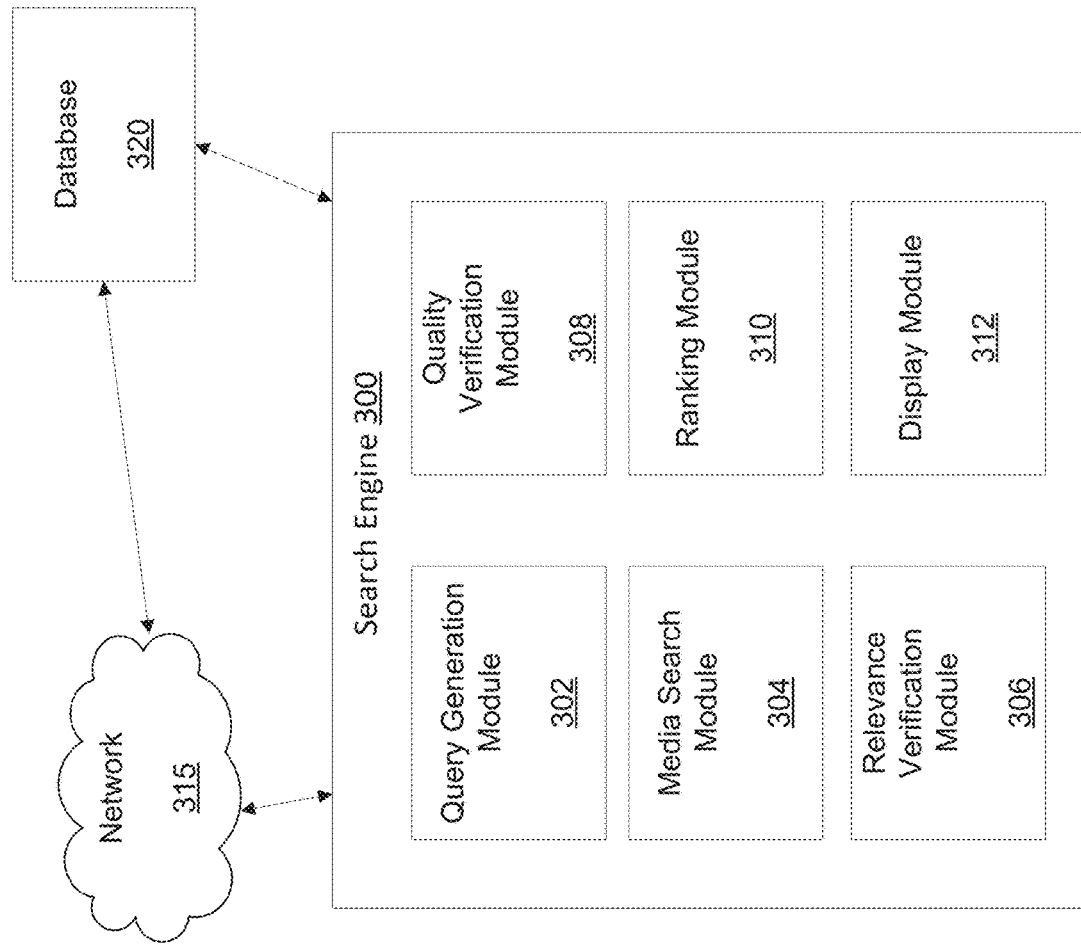
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a search engine 300, network 315 and database 320. The search engine 300 can be a special purpose machine or processor and could be hosted by a search server, application server, content server, social networking server, web server, messaging server, content provider, email service provider, ad server, user's computing device, and the like, or any combination thereof.

According to some embodiments, search engine 300 can be embodied as a stand-alone application that executes on a user device. In some embodiments, the search engine 300 can function as an application installed on the user's device, and in some embodiments, such application can be a web-based application accessed by the user device over a network. In some embodiments, the search engine 300 can be installed as an augmenting script, program or application to another searching, messaging and/or media content hosting/serving application, such as, for example, Yahoo!® Search, Yahoo!® Mail, Yahoo!® Messenger, Flickr®, Tumblr®, Twitter®, Instagram®, SnapChat®, Facebook®, and the like.

The database 320 can be any type of database or memory, and can be associated with a content server on a network (e.g., content server 106, search server 120, ad server 130 or application server 108 from FIG. 1) or a user's device (e.g., device 101-104 or device 200 from FIGS. 1-2). Database 320 comprises a dataset of data and metadata associated with local and/or network information related to users, services, applications, content (e.g., images) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information (i.e., past and present location(s) of the user, and future locations of the user (derived from a calendar or schedule of the user—e.g., planned activities), user biographic information, and the like, or some combination thereof. In some embodiments, the user data can also include, for purposes rendering and/or displaying images, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can comprise information associated with content providers, such as, but not limited to, photo hosting sites or providers that enable users to upload, download, share, create, edit, comment or otherwise avail users to media content (e.g., Flickr®, Tumblr®, Twitter®, Instagram®, SnapChat®, Facebook®, and the like). In some embodiments, database 320 can comprise data and metadata associated with image content from one and/or an assortment of media hosting sites. For example, the information can be related to, but not limited to, the user(s) that created or uploaded the image, the number of the user's that have shared the content, the identity of the user's that have shared an image, the location of the user(s) that uploaded and/or shared the image, the category of the image, the content type of the image, and the like. The information associated with stored images can also include, but is not limited to, timestamps indicating when the images where created, uploaded and/or shared, user generated descriptions of an image, tags associated with an image (e.g., tags describing an image and/or identified users, objects or locations/landmarks within an image) and/or geo-location information associated with the content of the image (e.g., a picture of the Golden Gate Bridge has information indicating that the image comprises content associated with the Golden Gate Bridge).

In some embodiments, the information stored in database 320 can be represented as an n-dimensional vector (or feature vector) for each image, where the information associated with the image corresponds to a node(s) on the vector. Additionally, the image information in database 320 for each image can comprise, but is not limited to, social metrics of the image (e.g., popularity of the image—a number of views, shares, favorites of the image), a title or comment(s) associated with the image, tags, descriptions, quality of the image, recency of the image's upload and/or share(s), and the like. Such factors can be derived from information provided by the user, a service provider (e.g., Yahoo!®), by the content/service providers providing image content (e.g., Tumblr®, Flickr®), or by other third party services (e.g., Twitter®, Facebook®, Instagram®, and the like), or some combination thereof. In some embodiments, such additional factors can also be translated as nodes on the n-dimensional vector for a respective image.

As such, database 320 can store and index image information in database 320 as linked set of image data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. While the discussion herein will focus on vector analysis of image information, as discussed above, the image information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

In some embodiments, database 320 can be a single database housing information associated with one or more devices, users, services and/or content providers, and in some embodiments, database 320 can be configured as a linked set of data stores that provides such information, as each datastore in the set is associated with and/or unique to a specific user, device, service and/or content provider. By way of a non-limiting example, database 320 can comprise the YFCC100M image dataset which consists of 100 Million publicly-available Creative Commons Images™ from Flickr®.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the search engine 300, and the database of stored resources 320. Indeed, as illustrated in FIG. 3, the search engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as search engine 300, and includes query generation module 302, media search module 304, relevance verification module 306, quality verification module 308, ranking module 310 and display module 312. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4A (and FIGS. 4B-4D, which are subparts of FIG. 4A), Process 400 details steps performed in accordance with some embodiments of the present disclosure for identifying and selecting a set of photos from a collection of photos that are to be provided to a user as result of search. As discussed herein, Process 400 details embodiments for the search engine 300 automatically performing a search for digital content associated with a POI based on, at least in part, visual comparisons of a set of content files. As discussed herein, the search engine 300 incorporates determined visual aesthetic features as factors for identifying the most definitive, precise and high-quality content files corresponding to the POI.

As discussed above, reference herein, specifically with regard to Process 400, will be directed to searching for, identifying and providing digital content files taking the form of image files; however, it should not be construed as limiting, as any type of digital media/content can be searched, identified and communicated (or displayed) according to the disclosed systems and methods. For example, the disclosed system sand methods can perform the disclosed searching, identification and providing/communication of the search results respective to any type of known or to be known digital content, which can include, but is not limited to, video, text, audio, short form videos (e.g., graphics interchange files (GIFs)) and/or any other type of known or to be known multi-media item or object.

Steps 402-404 of Process 400 are performed by the query generation module 302 of the search engine 300; Steps 406-410 are performed by the media search module 304; Step 412, and sub-steps 442-458 (of FIG. 4B) and sub-steps 462-468 (of FIG. 4C) are performed by the relevance verification module 306; Step 414 and sub-steps 482-486 (of FIG. 4D) are performed by the quality verification module 308; Steps 416-418 are performed by the ranking module 310; and Step 420 is performed by the display module 312.

Process 400 begins with Step 402 where an input is received from a user on an electronic communication platform that corresponds to the creation of a search query for images related to a POI. As understood by those of skill in the art, the input can be any type of input, including, but not limited to, a character string of text, numbers or symbols, image content, video content, voice or audio content, longitude and latitude coordinates, global positioning system (GPS) data, and the like, or some combination thereof. For example, the search input can be a query for a set of images related to a particular physical geographic location, such as text comprising the phrase "Golden Gate Bridge," where the Golden Gate Bridge is the geographic POI for which the user desires to view and/or receive images—e.g., pictures of the bridge. Thus, Step 402 involves the entering of the query and the input that triggers a search to be performed for images related to the query.

In Step 404, in response to receiving the search query input, query expansion (QE) is performed on the input that results in a set of queries related to the search query input being compiled (or created). In some embodiments, the QE performed in Step 404 can be performed by the search engine 300 executing software defined by any known or to be known QE algorithms, techniques or mechanisms, or via QE techniques that leverage indexes or libraries of searchable data. The result of the QE in Step 404 involves a set of queries being identified (e.g., compiled or created) that are related to the POI.

As understood by those of skill in the art, QE is the process of reformulating a seed query (e.g., the search input query from Step 402) to improve retrieval performance in information retrieval operations. In the context of search engines, QE involves evaluating a user's input (e.g., what input was typed or entered into the search query area) and expanding the search query to match additional documents.

In some embodiments, QE can involve the search engine 300 implementing computerized natural language processing and/or information retrieval techniques, such as, for example, i) finding synonyms of words, and searching for the synonyms within an index or library; ii) finding all the various morphological forms of words by stemming each word in the search query; iii) fixing spelling errors and automatically searching for the corrected form or suggesting it in the results; and iv) re-weighting the terms (or characters) in the original query, and the like, or some combination thereof.

As understood by those of skill in the art, the goal of QE is to not only increase information recall or identification of relevant content (e.g., documents, items, objects or pages), but also increase precision of the result set. Content which would not be included in the result set, which has the potential to be relevant to the user's desired query, is included, and without QE, such content would not have. By ranking the occurrences of both the user entered input and synonyms and alternate morphological forms, content with a higher density (e.g., high frequency and close proximity to the expanded query input) can migrate higher up in the search results, leading to a higher quality of the search results near the top of the results, despite the larger recall.

In Step 406, a search of an image collection is performed using the expanded queries compiled during the QE of Step 404. The search is executed using a search application programming interface (API) which, as understood by those of skill in the art, utilizes its inherent libraries, routines, protocols and tools to search and identify requested content. The image collection being searched is searchable via the search API, and can be associated with and/or hosted by a content provider(s), service provider(s), third party entity, a user's device or cloud-based storage resource location, and the like, or some combination thereof. In some embodiments the collection can comprise proprietary content (e.g., Getty® images), and/or can include user-generated content (UGC), as discussed above in relation to database 320 in FIG. 3.

As a result of the QE search in Step 406, a set of images from the collection is retrieved (or identified). Each identified image in the set is identified during the search as corresponding to the POI. These images can be referred to as "candidate" images.

For example, continuing with the above example, a search input of the POI: "Golden Gate Bridge" can be expanded to include other terms including, for example, "landmark in San Francisco," "San Francisco bridge." This expanded set of search terms can then be used to search an image collection associated with a hosting entity—for example Flickr® images. As a result of this search, a set of images from within the Flickr® collection are identified, and those identified images in the set correspond to the POI (e.g., they have data/metadata identifying those images as being related to the POI—where such data/metadata can indicate that the picture was captured while on the bridge, near the bridge (e.g., within a proximity to the bridge), the content of the picture depicts a digital representation of the bridge, and the like).

In Step 408, a score for each image in the identified set from Step 406 is identified. As understood by those of skill in the art, when a search API performs a search for content, it can return a ranked listing of results, where the results located higher in the listing are (at least initially by the API) identified/ranked (e.g., via an applied API score) as being more relevant than those lower in the listing. These listing locations can be afforded a score (or value) relative to their location within the listing. Therefore, as a result of this scoring, Step 408 can identify these scores, which will be leveraged along with other determined scores in determining the definitiveness score in Step 418, as discussed below in detail.

In Step 410, each image in the identified set from Step 406 is analyzed in order to determine visual characteristics of each image. In some embodiments, as discussed in more detail below, the analysis involves parsing each image in the set and identifying, based on the parsed data, the data and/or metadata that provides information indicating an image's visual characteristics (or features, descriptors, parameters or attributes).

In some embodiments, such analysis can be performed by the search engine 300 executing software defined by a convolutional network which identifies the deep features and/or raw data of image content. Such analysis can be implemented using any known or to be known deep learning architecture or algorithmic technique, such as, but not limited to, deep neural networks (DNN), artificial neural networks (ANNs), convolutional neural networks (CNNs), and deep belief networks. According to some embodiments, as discussed in more detail below, the disclosed deep learning methodology employs CNNs (however, it should not be construed to limit the present disclosure to only the usage of CNNs, as any known or to be known deep learning architecture or algorithm is applicable to the disclosed systems and methods discussed herein). CNNs consist of multiple layers which can include: the convolutional layer, rectified linear unit (ReLU) layer, pooling layer, dropout layer and loss layer, as understood by those of skill in the art. When used for image discovery, recognition and similarity, CNNs produce multiple tiers of deep feature collections by analyzing small portions an image.

For purposes of this disclosure, the data/metadata of an image, identified via the CNN software, can include, but are not limited to, visual characteristics of the images characterized (or categorized and labeled) by color features, texture features, type features, edge features and/or shape features, and the like. The results of these collections are then tiled so that they overlap to obtain a better representation of the image; which is repeated for every CNN layer. CNNs may include local or global pooling layers, which combine the outputs of feature clusters.

Thus, for example, according to some embodiments, Step 410 involves parsing, via applied CNN software, each image in the set to identify the raw image data for each image, as discussed above. The raw data for each image is then translated into an image feature vector having a dimensional value proportional to the pixel value of each image. According to embodiments of the present disclosure, the feature vector is a result of forward propagation of the raw data values through the layers of the CNN. For example, using a 4096 pixel product image, such propagation results in a 4096 dimensional feature vector which provides an indication as to the types of visual characteristics of an image.

Process 400 then turns to Step 412, where having determined the visual characteristics for each image, a relevance score for each image is determined. The processing steps of Step 412 performed by the search engine 300 in determining the relevance scores are illustrated in flowcharts in FIG. 4B and/or FIG. 4C.

Turning first to the flowchart in FIG. 4C, some embodiments of Step 412 can involve "pruning down" the set of images to ensure that the images that do not relate to the POI (at least to a threshold level) are not included in the set when it is further processed (in Steps 414-420). Such "pruning" can be performed if the images in the set are geo-tagged. Thus, in Step 462, each image in the set identified in Step 406 are analyzed by parsing the data and metadata associated with each image and identifying, based on parsed data/metadata, whether the images have geo-tags. If images are not geo-tagged, then the processed ends.

For the images that are geo-tagged, they are compared against geographical data associated with the POI. As understood by those of skill in the art, a POI can be defined by GPS data, longitude and latitude data, or any other type of real-world locational coordinates or data for identifying a physical geographic location. Thus, in order to compare the geo-tags of the images in the set to the POI, the geographical positioning information related to the POI is identified. Step 464. For example, this can involve performing a search via a search API for coordinates of the POI (e.g., longitude and latitude data, for example).

In Step 466, the comparison is performed between the positioning information indicated by each image's geo-tag and the geographical positioning information of the POI, and, in Step 468, those geo-tagged images that do not have geo-tag data matching the POI positioning information to at least a threshold level are removed from the image set. Thus, as a result of Step 468, those images in the set from Step 406 that are not determined to be associated with the same location as the POI (at least to a threshold level—e.g., within a proximity), then they are removed and not considered when further processing of the image set is performed (as in Steps 412-420, discussed below).

In some embodiments, even after the "pruning" occurring in sub-Steps 462-468 of Step 412, further analysis may be warranted because even those images that are geographically related to the POI may be visually unrelated to the POI (e.g., it can be a picture of a person on the Golden Gate Bridge, but that person takes up the entire shot and the bridge is not represented in the picture; or in another example, fog covers the visibility of the bridge) or of a quality level not satisfying a quality threshold.

In some alternative embodiments, the sub-steps performed in FIG. 4C may not be performed as a part of Step 412. In some embodiments, however, regardless of whether the sub-steps of FIG. 4C are performed, the sub-steps of FIG. 4B are preformed because they provide the mechanisms for determining the relevance score for the images in the set (and in some embodiments, those images remaining in the set).

Turning to FIG. 4B, Steps 442-458 provide sub-steps of Step 412 which detail how the search engine 300 determines a relevance score for each image in the set identified in Step 408 (and, in some embodiments, modified in Step 468). In Step 442, auto-tags from each image are extracted. The auto-tags are associated with the visual characteristics of the images, such that when the image is being analyzed via the CNN software, as discussed above, auto-tags can be identified (and/or inserted) in to the image. These auto-tags provide information indicating a type of content displayed by the images, and/or a type of image format or display. Thus, in Step 444, the auto-tags are analyzed to identify the type of content of each image, and based on such analysis, in Step 466, images that have auto-tags indicating that the image includes and/or is embodied as a particular type of image are removed from the set.

In some embodiments, Steps 444-446 involve analyzing the images and determining, based on the auto-tags, which images are formatted as a particular type of image. For example, if an image is identified as being formatted a particular way, then they can be removed from the image set.

For example, an undesired or unwanted format type could be, but is not limited to, images formatted as a poster, cartoon, map, and the like. In another embodiment, such formats could also include formats including, but not limited to, JPEG, JIFF, exif, TIFF, GIF, BMP, and the like. In another non-limiting embodiment, images that contain particular types of content identifiable from the auto-tags can be removed. For example, if an image contains digital representations of people's faces, then can be removed. In some embodiments, in order to perform the analysis and removal of Steps 444-446, auto-tags can be used in concert with the search engine 300 utilizing any known or to be known facial recognition technology in order to identify content within an image that includes a digital representation of a person.

In Step 448, a set of ground truth images that correspond to the POI are identified. "Ground truth" images are those images that are determined, derived or otherwise identified from a reliable source(s). For example, using the Golden Gate Bridge as the POI, a ground truth image set can be those images that are found on, or linked to the bridge's Wikipedia® page. Other example of "reliable sources" can include, but are not limited to, the bridge's official website, Facebook® account page, Tumblr® page, Flickr® page, Instagram® page, and the like.

In Step 450, each ground truth image is analyzed by parsing each image to identify the data and metadata of each image, and determining, based on the identified data and metadata, the visual characteristics of each ground truth image. Such analysis, parsing and identification of the visual characteristics of ground truth images can be performed in a similar manner as discussed above in relation to Step 410 of FIG. 4A.

In Step 452, the visual characteristics of the ground truth images and the visual characteristics of the images in the set (e.g., those images remaining in the set) are compared. In some embodiments, the search engine 300 compares the image features (identified via the CNN software) for both the ground truth set and for the candidate images. In some embodiments, an image is determined to be similar (e.g., to a threshold level of similarity) to a ground truth image if the Euclidean (L2) distance between the corresponding image features determined from the comparison is less than a specified threshold (e.g., a value of 250, for example).

Based on such comparison occurring in Step 452, a score for each image is determined based on how similar the image is to any ground truth image. Step 454. In some embodiments, images that do not match any ground truth images receive lower scores than those that match a portion ground truth images, and those images that match the most ground truth images, receive the highest scores.

In Step 456, a combined score for each image is determined based on the API score (from Step 408) and the visual characteristics score (from Steps 452-454). Thus, for each candidate image (i.e., the images remaining in the set of images identified in Step 406), a combined score is determined and assigned based on its relevance to the query (obtained from the search API in step 408), and the number of ground truth images it matches (from Steps 452-454). The relevance score for each image is based on the combined score. Step 458. The most definitive candidate images therefore are ones which have a high combined score, by virtue of having both a high relevance score, and matching many images from the ground truth set. However, these images are not guaranteed to be of the best quality. Therefore, Process 400 proceeds to Steps 414-420 where the search engine "screens out" low quality images as described next.

Turning back to FIG. 4A, having determined the relevance score for each image (in Step 412, and its sub-steps of FIG. 4B and FIG. 4C), Step 414 involves determining a quality score for each image. The details of Step 414 are provided in the flowchart illustrated in FIG. 4D, which details sub-Steps 482-486 for determining the quality scores.

In Step 482, a visual quality score for each image is determined by the search engine 300 applying software executing a linear regression model on the data and/or metadata of the images (e.g., applying a linear regression model on the visual characteristics of the images determined in Step 410). It should be understood that the software here can apply any known or to be known linear regression modeling algorithm, technique or mechanism that models the relationships between the variables (or parameters) of the visual characteristics of the image, and those images with greater relationships between their variables are assigned higher scores.

In Step 484, an aesthetic quality score for each image is determined by the search engine 300 applying software executing a CNN on the data and/or metadata of the images. As discussed above, such determination can be performed by the search engine 300 implementing any known or to be known deep learning architecture or algorithmic technique, such as, but not limited to, DNNs, ANNs, CNNs, and deep belief networks, and the like, and those images determined to have "higher quality" aesthetic values from the CNN analysis of the visual features are assigned higher scores.

In Step 486, each image's visual quality score and aesthetic quality score are combined in order to determine (or compute) the images' quality score (i.e., Step 414).

Turning back to FIG. 4A, having determined the relevance score and quality score for each image, a definitiveness score for each image is determined based on a combination of the images' relevance score and quality score. Step 416. In some embodiments, for a given candidate image I, the definitiveness score D can be determined (or computed) as follows:

$$D_i = \alpha R_i + \beta G_i + \gamma Q_i$$

where $R_i$ is the original relevance score of image i returned by the search API (Step 408), $G_i$ is the score determined by how many ground truth image it matches (Step 454), and $Q_i$ is the quality score (Step 486/Step 414). In some embodiments, each score is normalized to be in a predetermined range, for example a range (0, 1). In some embodiments, the weights \alpha, \beta, \gamma are set empirically.

In Step 418, the images (e.g., remaining images in the candidate set) are ranked (or re-ranked) based on the definitiveness score determined in Step 416. In some embodiments, those images with a definitiveness score satisfying a definitiveness score threshold are ranked, and those that do not are discarded.

In Step 420, the ranked set of images is caused to be displayed as a search result. In some embodiments, such display involves the search engine 300 causing a server to instruct a user device to display the results in a manner according to the ranking, thereby providing the server with control as to how images are displayed, in what order, and/or in what orientation (e.g., layout). In some embodiments, the ranked display may be augmented with identifiers indicating how canonical the images are, which as a result of the definitiveness determination in the preceding steps, indicates to the user that the results are high-quality and relevant to the POI. In some embodiments, the ranked set can be displayed such that each image in the set is provided to a user as an electronic card, where each card's display is ordered and/or modified according to its ranking.

Figure 5:
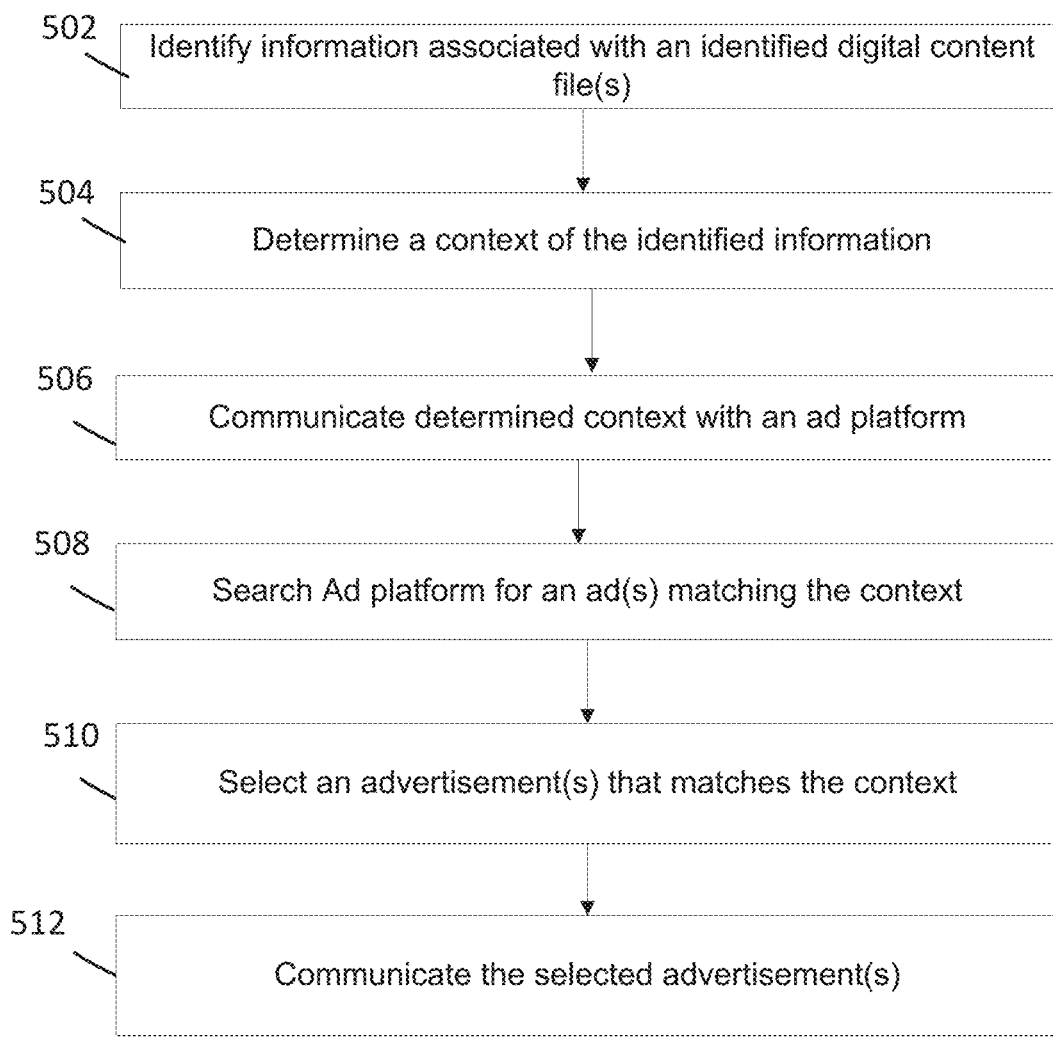
FIG. 5 is a flowchart illustrating steps performed in accordance with some embodiments of the present disclosure.

FIG. 5 is a work flow example 500 for serving relevant digital media content associated with or comprising advertisements (e.g., digital advertisement content) based on the information associated with an identified digital content item(s) (e.g., a single content file, a plurality of files, or a collection of files, for example, a search result comprising a set of image files), as discussed above in relation to FIGS. 3-4D. Such information, referred to as "digital content item information" for reference purposes only, can include, but is not limited to, information associated with an identified digital content item(s) (e.g., the identity of the creator of the content item, identity of the entity hosting and/or storing content item, the time it was created, stored, downloaded, searched for and/or identified, and the like, the type or format of the content item, the category of the digital content included in the content item, the location associated with the content item, and the like), the data and/or metadata associated with the POI used for identifying the content item(s), the identity of the platform and/or application being used to perform the search based on the POI, and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital content item that is renderable by a computing device, and such digital content item comprises digital content relaying proprietary or promotional content provided by a network associated third party.

In Step 502, digital content item information is identified. As discussed above, the digital content item information can be based any of the information from processes outlined above with respect to FIGS. 3-4D. For purposes of this disclosure, Process 500 will refer to single identified digital content item as the basis for serving a digital advertisement(s); however, it should not be construed as limiting, as any number of items, searches, POIs, as well as programs used during identification of the digital content item can form such basis, without departing from the scope of the instant disclosure.

In Step 504, a context is determined based on the identified digital content item information. This context forms a basis for serving advertisements related to the digital content item information. In some embodiments, the context can be determined by determining a type of content depicted by the digital content item. In some embodiments, the context can be based on a determined category which the digital content item information of Step 502 represents. For example, the identified digital content item can include content associated with a category corresponding to "landmarks" (e.g., the picture depicts the sunset over the Golden Gate Bridge, which is a landmark, and the POI used for searching and identifying the digital content item); therefore, the context identified in Step 504 can be related to "landmarks" or other "US landmarks" and can be leveraged in order to identify digital ad content of interest, as discussed herein in relation to the steps of Process 500. In some embodiments, the identification of the context from Step 504 can occur before, during and/or after the analysis detailed above with respect to Process 400 (and its sub-parts), or some combination thereof.

In Step 506, the determined context is communicated (or shared) with an advertisement platform comprising an advertisement server 130 and ad database. Upon receipt of the context, the advertisement server 130 performs (e.g., is caused to perform as per instructions received from the device executing the search engine 300) a search for a relevant advertisement within the associated ad database. The search for an advertisement is based at least on the identified context.

In Step 508, the advertisement server 130 searches the ad database for a digital advertisement(s) that matches the identified context. In Step 510, an advertisement is selected (or retrieved) based on the results of Step 508. In some embodiments, the selected advertisement can be modified to conform to attributes or capabilities of the page, interface, message, platform, application or method upon which the advertisement will be displayed, and/or to the application and/or device for which it will be displayed. In some embodiments, the selected advertisement is shared or communicated via the application the user is utilizing to search, view and/or render content (from the search). Step 512. In some embodiments, the selected advertisement is displayed within a portion of the interface or within an overlaying or pop-up interface associated with the search interface used to enter the query and perform the search.

As shown in FIG. 6, internal architecture 600 of a computing device(s), computing system, computing platform and the like includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), media disk interface 608 and/or media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces 622 not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing image and/or video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device, a search query comprising information associated with a point of interest (POI), said POI associated with a physical geographic location;
   performing, via the computing device, query expansion on said search query, said query expansion comprising compiling a set of search queries related to the POI based on said information;
   searching, via the computing device executing a search application program interface (API), a collection of images based on said set of search queries, said searching comprising identifying a set of candidate images from said collection, said candidate images each determined, from said search, to correspond to said POI;

identifying, via the computing device, via the search API, a score for each candidate image, said score indicating a value of correspondence to the said POI determined during said search;

analyzing, via the computing device, each candidate image in order to determine data and metadata indicating visual characteristics of each candidate image, said analysis comprising parsing, via the computing device, each candidate image, and identifying, based on said parsing, said data and metadata, and analyzing said data and metadata to determine the visual characteristics of each candidate image;

determining, via the computing device, a relevance score for each candidate image that indicates a relationship between each candidate image, said relevance score determination comprising determining a value of visual similarity each candidate image's visual characteristics has to visual characteristics of a ground truth image of the POI, and computing said relevance score based on the visual similarity value and the score;

determining, via the computing device, a quality score for each candidate image, said quality score determination comprising analyzing the visual characteristics of each candidate image, and determining the visual quality and the aesthetic quality of the visual characteristics of each candidate image, such that the quality score of a candidate image is based on the visual quality and the aesthetic quality of the candidate image;

determining, via the computing device, a definitiveness score of each candidate image based on the determined relevance score and the determined quality score for each candidate image;

automatically identifying, by the computing device, without user input, a type indicator, the type indicator comprising information indicating a type of content depictable within an image;

automatically removing, via the computing device, candidate images from the set of candidate images that have a type indicator matching the identified type indicator;

ranking, via the computing device, each remaining candidate image based on each remaining candidate image's determined definitiveness score; and communicating, via the computing device, the ranked set of images to a device of a user device, said communication causing display of each ranked image within a user interface (UI) of the user device.

2. The method of claim 1, further comprising:

extracting, based on the determined data and metadata of each candidate image, auto-tags from each candidate image; and analyzing the auto-tags, and based on said analysis, identifying the type indicator associated with each candidate image, wherein said removal of the candidate images is based on said analysis.

3. The method of claim 2, further comprising:

searching, over a network, a network resource for said ground truth image, said search comprising identifying the network resource as a reliable source of information for said POI, and retrieving, from the network resource, said ground truth image;

parsing the ground truth image, and identifying, based on said parsing, data and metadata indicating the visual characteristics of the ground truth image;

comparing the visual characteristics of the ground truth image to the visual characteristics of each candidate image; and determining a score for each candidate image based on said comparison, wherein said score is said visual similarity value.

4. The method of claim 1, further comprising:

analyzing the data and metadata of each candidate image, and identifying, based on said analysis, geo-tags of the candidate images;

identifying geographical positional information related to the POI;

comparing location information associated with the geo-tags to the geographical positional information of the POI; and removing, based on said comparison, candidate images that have location information matching the geographical positional information of the POI at a value failing to satisfy a threshold of proximity to the POI.

5. The method of claim 1, further comprising:

applying, via the computing device, software executing a linear regression model to each candidate image; and determining, based on said application of the linear regression model software, a score for said visual quality of each candidate image.

6. The method of claim 1, further comprising:

applying, via the computing device, software executing a deep convolutional network to each candidate image; and determining, based on said application of the deep convolutional network software, a score for said aesthetic quality of each candidate image.

7. The method of claim 1, wherein said determination of the definitiveness score for each candidate image is based on a computation that combines the determined relevance score and the determined quality score for each candidate image.

8. The method of claim 7, wherein said relevance score and quality score for each candidate image are normalized to be in a predetermined range.

9. The method of claim 1, wherein said determination of the data and metadata indicating the visual characteristics of each candidate image is based on the computing device executing deep convolutional network software on said candidate images.

10. The method of claim 1, wherein said caused display comprises communicating each image as an electronic card that displays digital content of each image individually.

11. The method of claim 1, further comprising:

determining a context based on said POI;

causing communication, over the network, of said context to an third party content platform to obtain a digital content item comprising third party digital content associated with said context;

receiving, over the network, said digital content item; and causing display said digital content item in association with the display of said ranked images.

12. A non-transitory computer-readable storage medium tangibly encoded with computer-executable instructions, that when executed by a processor associated with a computing device, performs a method comprising:

receiving, at the computing device, a search query comprising information associated with a point of interest (POI), said POI associated with a physical geographic location;

performing, via the computing device, query expansion on said search query, said query expansion comprising compiling a set of search queries related to the POI based on said information;

searching, via the computing device executing a search application program interface (API), a collection of images based on said set of search queries, said searching comprising identifying a set of candidate images from said collection, said candidate images each determined, from said search, to correspond to said POI;

identifying, via the computing device, via the search API, a score for each candidate image, said score indicating a value of correspondence to the said POI determined during said search;

analyzing, via the computing device, each candidate image in order to determine data and metadata indicating visual characteristics of each candidate image, said analysis comprising parsing, via the computing device, each candidate image, and identifying, based on said parsing, said data and metadata, and analyzing said data and metadata to determine the visual characteristics of each candidate image;

determining, via the computing device, a relevance score for each candidate image that indicates a relationship between each candidate image, said relevance score determination comprising determining a value of visual similarity each candidate image's visual characteristics has to visual characteristics of a ground truth image of the POI, and computing said relevance score based on the visual similarity value and the score;

determining, via the computing device, a quality score for each candidate image, said quality score determination comprising analyzing the visual characteristics of each candidate image, and determining the visual quality and the aesthetic quality of the visual characteristics of each candidate image, such that the quality score of a candidate image is based on the visual quality and the aesthetic quality of the candidate image;

determining, via the computing device, a definitiveness score of each candidate image based on the determined relevance score and the determined quality score for each candidate image;

automatically identifying, by the computing device, without user input, a type indicator, the type indicator comprising information indicating a type of content depictable within an image;

automatically removing, via the computing device, candidate images from the set of candidate images that have a type indicator matching the identified type indicator;

ranking, via the computing device, each remaining candidate image based on each remaining candidate image's determined definitiveness score; and communicating, via the computing device, the ranked set of images to a device of a user device, said communication causing display of each ranked image within a user interface (UI) of the user device.

13. The non-transitory computer-readable storage medium of claim 12, further comprising:

extracting, based on the determined data and metadata of each candidate image, auto-tags from each candidate image; and analyzing the auto-tags, and based on said analysis, identifying the type indicator associated with each candidate image, wherein said removal of the candidate images is based on said analysis.

14. The non-transitory computer-readable storage medium of claim 13, further comprising:

searching, over a network, a network resource for said ground truth image, said search comprising identifying the network resource as a reliable source of information for said POI, and retrieving, from the network resource, said ground truth image;

parsing the ground truth image, and identifying, based on said parsing, data and metadata indicating the visual characteristics of the ground truth image;

comparing the visual characteristics of the ground truth image to the visual characteristics of each candidate image; and determining a score for each candidate image based on said comparison, wherein said score is said visual similarity value.

15. The non-transitory computer-readable storage medium of claim 12, further comprising:

analyzing the data and metadata of each candidate image, and identifying, based on said analysis, geo-tags of the candidate images;

identifying geographical positional information related to the POI;

comparing location information associated with the geo-tags to the geographical positional information of the POI; and removing, based on said comparison, candidate images that have location information matching the geographical positional information of the POI at a value failing to satisfy a threshold of proximity to the POI.

16. The non-transitory computer-readable storage medium of claim 12, further comprising:

applying, via the computing device, software executing a linear regression model to each candidate image; and determining, based on said application of the linear regression model software, a score for said visual quality of each candidate image.

17. The non-transitory computer-readable storage medium of claim 12, further comprising:

applying, via the computing device, software executing a deep convolutional network to each candidate image; and determining, based on said application of the deep convolutional network software, a score for said aesthetic quality of each candidate image.

18. The non-transitory computer-readable storage medium of claim 12, wherein said determination of the definitiveness score for each candidate image is based on a computation that combines the determined relevance score and the determined quality score for each candidate image, wherein said relevance score and quality score for each candidate image are normalized to be in a predetermined range.

19. The non-transitory computer-readable storage medium of claim 12, wherein said caused display comprises communicating each image as an electronic card that displays digital content of each image individually.

20. A computing device comprising:

a processor; and a non-transitory computer-readable storage medium for tangibly storing thereon program logic for execution by the processor, the program logic comprising:

logic executed by the processor for receiving, at the computing device, a search query comprising information associated with a point of interest (POI), said POI associated with a physical geographic location;

logic executed by the processor for performing, via the computing device, query expansion on said search query, said query expansion comprising compiling a set of search queries related to the POI based on said information;

logic executed by the processor for searching, via the computing device executing a search application program interface (API), a collection of images based on said set of search queries, said searching comprising identifying a set of candidate images from said collection, said candidate images each determined, from said search, to correspond to said POI;

logic executed by the processor for identifying, via the computing device, via the search API, a score for each candidate image, said score indicating a value of correspondence to the said POI determined during said search;

logic executed by the processor for analyzing, via the computing device, each candidate image in order to determine data and metadata indicating visual characteristics of each candidate image, said analysis comprising parsing, via the computing device, each candidate image, and identifying, based on said parsing, said data and metadata, and analyzing said data and metadata to determine the visual characteristics of each candidate image;

logic executed by the processor for determining, via the computing device, a relevance score for each candidate image that indicates a relationship between each candidate image, said relevance score determination comprising determining a value of visual similarity each candidate image's visual characteristics has to visual characteristics of a ground truth image of the POI, and computing said relevance score based on the visual similarity value and the score;

logic executed by the processor for determining, via the computing device, a quality score for each candidate image, said quality score determination comprising analyzing the visual characteristics of each candidate image, and determining the visual quality and the aesthetic quality of the visual characteristics of each candidate image, such that the quality score of a candidate image is based on the visual quality and the aesthetic quality of the candidate image;

logic executed by the processor for determining, via the computing device, a definitiveness score of each candidate image based on the determined relevance score and the determined quality score for each candidate image;

logic executed by the processor for automatically identifying, by the computing device, without user input, a type indicator, the type indicator comprising information indicating a type of content depictable within an image;

logic executed by the processor for automatically removing, via the computing device, candidate images from the set of candidate images that have a type indicator matching the identified type indicator;

logic executed by the processor for ranking, via the computing device, each remaining candidate image based on each remaining candidate image's determined definitiveness score; and logic executed by the processor for communicating, via the computing device, the ranked set of images to a device of a user device, said communication causing display of each ranked image within a user interface (UI) of the user device.

\* \* \* \* \*